(12) United States Patent
Krahl

(10) Patent No.: US 8,397,431 B2
(45) Date of Patent: Mar. 19, 2013

(54) EMERGENCY JETTISON WINDOW PANE AND ASSOCIATED EJECTION SYSTEM

(75) Inventor: Kornelius Krahl, Mering (DE)

(73) Assignee: Eurocopter Deutschland GmbH, Donawoerth (DE)

( * ) Notice: Subject to any disclaimer, the term of this patent is extended or adjusted under 35 U.S.C. 154(b) by 169 days.

(21) Appl. No.: 12/899,006

(22) Filed: Oct. 6, 2010

(65) Prior Publication Data

US 2012/0085033 A1   Apr. 12, 2012

(51) Int. Cl.
| | |
|---|---|
| *E05B 65/10* | (2006.01) |
| *E06B 7/18* | (2006.01) |
| *B64C 1/14* | (2006.01) |
| *B64D 1/08* | (2006.01) |

(52) U.S. Cl. .... 49/141; 49/477.1; 244/129.3; 244/137.2
(58) Field of Classification Search ............... 49/50, 57, 49/141, 276, 316, 477.1; 296/146.15, 187.06, 296/201; 244/129.3, 121, 122 AF, 129.1, 244/129.4, 129.5, 118.5, 905, 137.2
See application file for complete search history.

(56) References Cited

U.S. PATENT DOCUMENTS

| | | | | |
|---|---|---|---|---|
| 3,161,229 A | * | 12/1964 | Sanders | 160/40 |
| 3,178,779 A | * | 4/1965 | Clark et al. | 277/646 |
| 3,442,048 A | * | 5/1969 | Enrique | 49/141 |
| 3,454,245 A | * | 7/1969 | Hannagan et al. | 244/137.2 |
| 3,737,193 A | * | 6/1973 | Cain | 296/96.22 |
| 3,741,583 A | * | 6/1973 | Usui et al. | 280/735 |
| 3,802,123 A | * | 4/1974 | Frey et al. | 49/141 |
| 4,127,966 A | * | 12/1978 | Schmidt | 49/141 |
| 4,565,535 A | * | 1/1986 | Tassy | 441/118 |
| 4,978,089 A | * | 12/1990 | Alquier et al. | 244/129.5 |
| 5,209,498 A | * | 5/1993 | Colin | 277/646 |
| 5,746,026 A | * | 5/1998 | Brede et al. | 49/506 |
| 5,823,608 A | * | 10/1998 | Tanaka et al. | 296/146.2 |
| 5,826,824 A | * | 10/1998 | Martin et al. | 244/129.3 |
| 6,095,553 A | * | 8/2000 | Chou et al. | 280/735 |
| 6,164,715 A | * | 12/2000 | Mosaner | 296/146.1 |
| 6,308,918 B1 | * | 10/2001 | Ferrier | 244/129.3 |
| 6,427,383 B1 | * | 8/2002 | Brooks et al. | 49/141 |
| 7,178,810 B1 | * | 2/2007 | Kuhary | 277/646 |
| 7,730,668 B2 | * | 6/2010 | Dankert et al. | 49/141 |
| 2006/0010769 A1 | * | 1/2006 | Pelz | 49/141 |

FOREIGN PATENT DOCUMENTS

| | | |
|---|---|---|
| DE | 3925430 A1 | 2/1991 |
| DE | 19628279 A1 | 1/1998 |

(Continued)

OTHER PUBLICATIONS

Search Report and Written Opinion; Application No. EP 094 40 0032; dated Dec. 22, 2009.

*Primary Examiner* — Katherine Mitchell
*Assistant Examiner* — Scott Denion
(74) *Attorney, Agent, or Firm* — Brooks Kushman P.C.

(57) ABSTRACT

An ejection system for a window pane or panel which is affixed to a frame structure with at least one clamping seal. The system has means for ejecting the panel or window pane from the clamping seal and (a) a frame part with a housing which surrounds the inner face of the window pane or panel along a peripheral path, wherein the housing has an open end facing the window pane or panel; (b) an inflatable seal arranged in the housing; (c) a pressure source which is joined to the inflatable seal; and (d) an emergency actuation means to release pressure from the gas pressure source. The released air or gas expands the inflatable seal which pushes the window pane or panel out of the clamping seal.

20 Claims, 1 Drawing Sheet

SECTION B-B

FOREIGN PATENT DOCUMENTS

| | | |
|---|---|---|
| DE | 19733034 A1 | 2/1999 |
| DE | 19754814 A1 | 6/1999 |
| DE | 20013990 U1 | 12/2000 |
| DE | 19951305 A1 | 4/2001 |

* cited by examiner

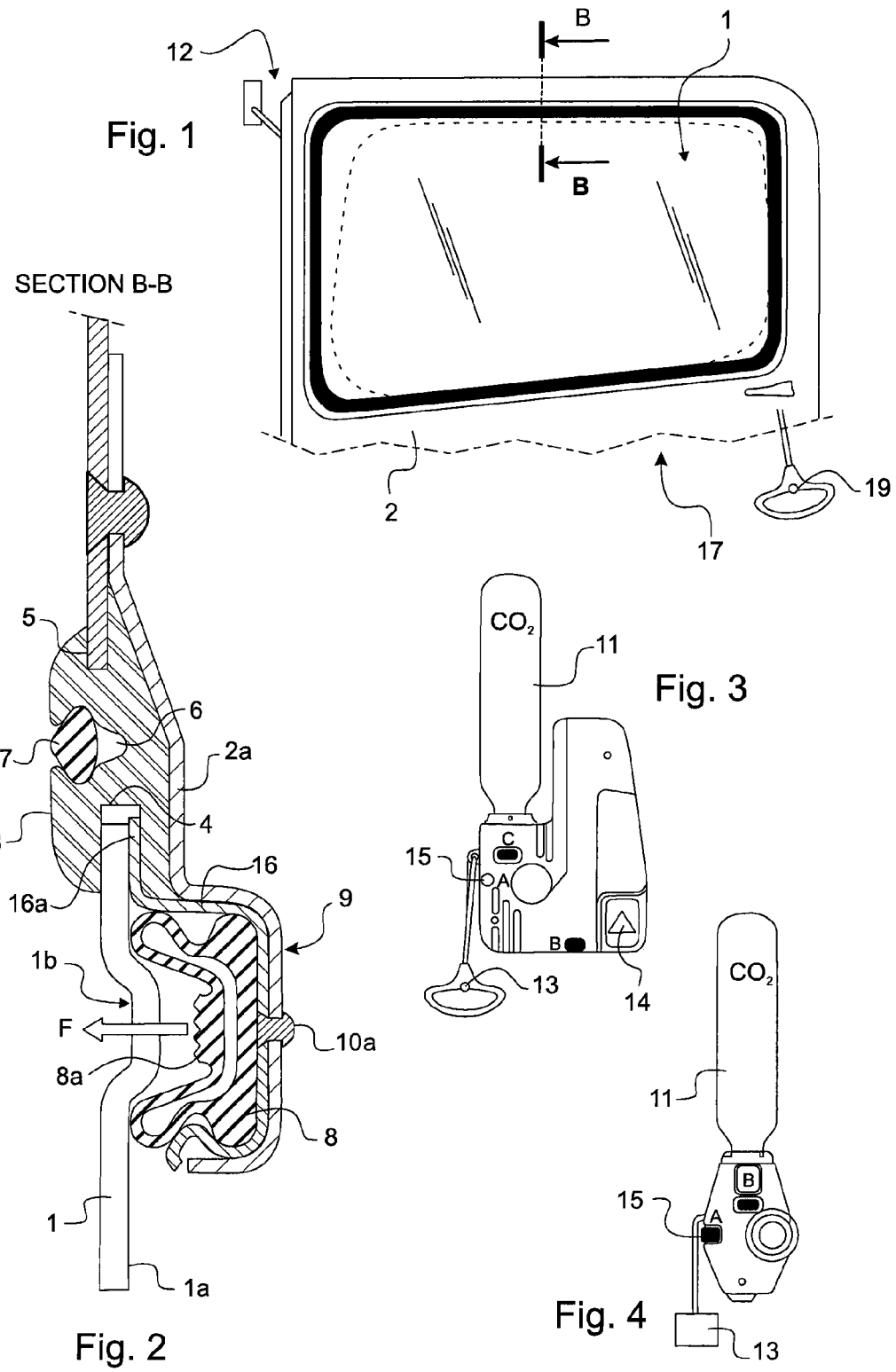

EMERGENCY JETTISON WINDOW PANE AND ASSOCIATED EJECTION SYSTEM

FIELD OF THE INVENTION

The present invention relates to the technical field of emergency exit doors, for example in aircrafts, trains, boats or other vehicles. The invention concerns more specifically emergency jettison panels or window panes in aircrafts, such as helicopters, which are not equipped with pressurised cabins.

After an accident or a crash of a helicopter or another aircraft, it can be necessary for passengers to leave quickly their cabin, while the normal exit door is blocked. The passengers may also be injured and a quick access in the cabin must be possible for any rescue team. It is the reason why especially helicopters, are equipped with emergency jettison window panes.

BACKGROUND OF THE INVENTION

Up to now, the clamping seal of a jettison window pane is formed with four slits on the inside face and on the outside face. The two lateral slits on the inner side and on the outer side are each fitted with filler, for example a PVC cord with matching profile, which expands the circumference of the clamping seal so that the window pane is hold firmly in the frame. The filler in the inner and outer lateral slits can be pulled out of the clamping seal by means of an emergency handle on each side of the window. After the removal of the filler, the window pane can be pushed out of the frame.

Even though the filler is removed, there is still a lot of strength required, to press out the window pane. Furthermore, it is important to start pressing on the window pane in a corner to be successful. To handle this, in case of emergency, is not easy for a weak or injured person who is not familiar with the system.

Known emergency jettison window panes are also associated with an ejection system for a window pane or panel comprising.

It is known for example to use an ejection system for a window pane or panel which is fixed to a frame with at least one clamping seal, comprising means for ejecting the panel or window pane from the clamping seal.

From the printed publication DE 199 51 305 A1, it is for example, known to use pyrotechnic means surrounding the whole window pane. The pyrotechnic means comprise a linear gas generator which produces gas to push the window pane out of the frame, after a tripping mechanism has been activated.

Such a system is associated with disadvantages when used in an aircraft, in particular in helicopters for which every constitutive part is very expensive. So after an activation of the pyrotechnic means, no more reuse is possible. In addition, the linear gas generator is embedded in a support hose. There is no possibility to check if the linear gas generator is still in a good working order. It should therefore be completely removed and replaced.

There are also a lot of requirements which have to be respected for handling and shipping of pyrotechnic materials to avoid accidents. This makes the servicing and the spare part supply very difficult.

The document U.S. Pat. No. 3,737,193 describes for example, in particular in FIGS. 1 and 3 and in the corresponding text, an ejection system for a window pane of a vehicle which is affixed to a frame with at least a clamping seal, comprising a frame part with a seal housing which surrounds the inner face of the pane along a peripheral path. The seal housing has also an open end facing the pane. The ejection system comprises also an inflatable seal arranged in the housing, a gas or air pressure source which is connected to the inflatable seal and emergency actuation means to release the pressure from the pressure source, wherein the released air or gas expands the inflatable seal which pushes the pane out of the clamping seal (see FIG. 4).

SUMMARY OF THE INVENTION

It is an object of the invention to overcome the mentioned disadvantages and to be able to provide a new and effective ejection system, which working order can easily be checked at each overhaul.

It is an additional object of the invention to provide a new and effective ejection system, which constitutive parts can be used again, even after an activation of the ejection system.

It is an additional object of the invention to provide a new and effective ejection system, which constitutive parts are cheap and easy to manufacture.

These objects are met by an ejection system which in one embodiment comprises:
  a frame part with a seal housing which surrounds the inner face of the window pane or panel along a peripheral path, wherein the seal housing has an open end facing the window pane or panel,
  an inflatable seal arranged in the seal housing,
  a gas or air pressure source which is connected to the inflatable seal,
  and emergency actuation means to release the pressure from pressure source, wherein the released gas or air expands the inflatable seal which pushes the window pane or panel out of the clamping seal, the ejection system comprises a support sheet affixed in the seal housing and which fits at least partly with the seal housing, the inflatable seal being mounted in the support sheet, wherein at least one side wall of the support sheet has an end part projecting out of the seal housing and on which rests the inner face of the panel or window pane.

According to one exemplary and advantageous embodiment of the invention, the emergency actuation means comprise a manual activation handle arranged in the cabin and/or automatic detection and activating means integrated in an automatic tablet.

According to one exemplary and advantageous embodiment of the invention, a second manual activation handle is arranged at the outside of the cabin.

According to one exemplary and advantageous embodiment of the invention, the inflatable seal is made of materials such as elastomers and reinforcing materials. The inflatable seal is made for example of a silicone material reinforced with a polyester fabric.

According to one exemplary and advantageous embodiment of the invention, the combination of the shape of the inflatable seal and of the shape of the support sheet produce a pushing force F mostly in a orthogonal direction to the inner face of the panel or window pane.

According to one exemplary and advantageous embodiment of the invention, the panel or window pane has, on its inner face, a projecting zone, facing a movable part of the inflatable seal, to minimize the required stroke of the movable part the eject the window pane.

According to one exemplary and advantageous embodiment of the invention, the pressure source is a gas cartridge, for example a $CO_2$ cartridge.

Alternatively, the pressure source could be an air pressure generated by a hand pump or by bleed air from an engine or from a compressor.

According to one exemplary and advantageous embodiment of the invention, the ejection system comprises a locking device which inactivates the emergency activation means.

The objects of the invention are also met by an emergency jettison panel or window pane, associated with an ejection system according to the invention.

The objects of the invention are also met by a door for an aircraft, such as a helicopter, comprising an emergency jettison panel or window pane associated with an ejection system according to the invention.

The objects of the invention are also met by an aircraft, for example a helicopter comprising an emergency jettison window pane or jettison panel, associated with an ejection system according to the invention.

According to the invention, the safety of the passengers and crew is improved because the working order of the ejection system can easily be checked. In most cases it is sufficient to replace the gas cartridge to ensure the good working order of the ejection system.

There is a further advantage in that an ejection system comprises parts which can be reused, even after an activating of the ejection system.

There is a further advantage according to the invention in that there are no dangerous tripping means in use, such as ignition means of the pyrotechnic means, which could set fire to an evaporated and flammable combustible, after a crash for example.

The parts of the ejection system according to the invention are easy to handle and no additional requirements have to be respected for handling and shipping them, since no pyrotechnic means are used.

BRIEF DESCRIPTION OF THE DRAWINGS

Further advantages, characteristics and details of the invention are set out in the following description of a preferred exemplary embodiment as well as with reference to the drawings, in which:

FIG. 1 depicts an example of a jettison window pane according to the invention;

FIG. 2 is a view along the section B-B of FIG. 1, showing a structure of mounting means and ejection means of a jettison window pane integrating an ejection system according to the invention;

FIG. 3, is a view of an exemplary embodiment of additional parts of an ejection system according to the invention; and FIG. 4, is a view of another exemplary embodiment of additional parts of an ejection system according to the invention.

DETAILED DESCRIPTION OF THE PREFERRED EMBODIMENT

FIG. 1 shows an emergency jettison window pane 1 or panel which is mounted in a frame 2 and which comprises an ejection system according to the invention.

Some parts of the ejection system are illustrated in a more detailed way in FIG. 2 which is a section view B-B of FIG. 1.

The window panel 1 is mounted on the frame 2 by means of a clamping seal 3. This clamping seal 3 advantageously surrounds the window pane 1, which peripheral end is engaged in a recess 4 of the clamping seal 3. The frame 2 is engaged in another recess 5 of the clamping seal 3.

A housing 6 is integrated in the clamping seal 3 in order to house a filler 7 which expands the clamping seal 3 so that the window pane 1 is hold firmly on the frame 2. The filler 7 is only required to mount the window pane 1 and it is not necessary to remove it before ejecting the window pane 1.

The clamping seal 3 is for example made of materials such as rubber or any other kind of elastomers.

The ejection system comprises also an inflatable seal 8 which is arranged in a seal housing 9. The inflatable seal 8 has a movable part 8a which gets into contact with the window pane 1 and pushes against the inner face 1a when the internal volume of the inflatable seal 8 expands.

The seal housing 9 is shaped in a frame part 2a fixed to the frame 2, for example by means of rivets 10.

The seal housing 9 surrounds the inner face 1a of the window pane 1 or panel, along a peripheral path, wherein an open end of the seal housing 9 is facing the window pane 1 or panel.

The ejection system comprises also a gas cartridge 11, illustrated on FIG. 3 and on FIG. 4, which is connected to the inflatable seal 8. The connection between the gas cartridge 11 and the inflatable seal 8 is achieved by means of a connection hose (not shown).

The ejection system further comprises emergency actuation means to release the gas from the gas cartridge 11. The released gas expands the inflatable seal 8 which pushes the window pane 1 or panel out of the clamping seal 3. To inflate the inflatable seal 8, a pressure of about 2.8 bars is required. A $CO_2$ cartridge, for example similar to those known from life jackets, could therefore be used as an ideal pressure source.

The emergency actuation means comprise a manual activation handle 13 arranged in the cabin. The activation handle 13 has to be pulled for releasing the gas from the gas cartridge 11.

A second manual activation handle 19 can also be arranged at the outside of the cabin.

In an embodiment of the invention, the ejection system comprises automatic detection and activating means, which could be activated by contact with water, through an automatic tablet 14 for example in case of emergency water landing.

In an advantageously embodiment of the invention, the ejection system comprises a locking device 15 which inactivates the emergency activation means. This could be the case for example during overhaul operations.

The ejection system comprises, in an advantageously embodiment, a support sheet 16 affixed in the seal housing 9. This support sheet 16 fits at least partly with the seal housing 9. At least one side wall of the support sheet 16 has an end part 16a projecting out of the seal housing 9. The end part 16a on which rests the inner face 1a of the panel or the window pane 1 is inserted in the recess 4.

The combination of the shape of the inflatable seal 8 and of the shape of the support sheet 16, produce a pushing force F mostly in a orthogonal direction to the inner face 1a of the panel or window pane 1. This support sheet 16 is affixed in the seal housing 9 by means of rivets 10a and constitutes a guiding device for the displacement in direction of the inner face 1a, of the movable part 8a.

The panel or window pane 1 has advantageously on its inner face 1a, a projecting zone 1b facing the movable part 8a of the inflatable seal 8, to minimize the stroke of the movable part 8a during the expansion of the inflatable seal 8.

While the main sealing function is carried out by the clamping seal 3, the inflatable seal 8 supports a little this sealing function as long as the ejection of the window pane 1 has not occurred. This natural sealing function avoids the use of additional sealing means.

During operation, after pulling the emergency handle 13, the ejection system ejects by itself the window pane 1. The pushing force F generated by the expanded inflatable seal 8, for example around the peripheral area of the window pane 1 is high enough to push the window pane 1 out of the clamping seal 3. In an emergency case, a passenger has only to pull the emergency handle 13. This is easy to accomplish even if the passenger, who may be weak or injured, is not familiar with the ejection system and since he does not need much strength to pull it A door 17 for an aircraft, such as a helicopter, comprising an emergency jettison panel or window pane 1 can be associated with an ejection system according to the invention. A mounting bracket 12 of the door 17 is partly illustrated on FIG. 1.

Of course, within the scope of the invention it is possible to provide still further embodiment options. The invention also covers variants of technical characteristics that are not described in detail but that suggest themselves to the average person skilled in the art.

What is claimed is:

1. An ejection system for a window pane or panel which is affixed to a frame with at least one clamping seal, comprising:
    means for ejecting the panel or window pane from the clamping seal,
    a recess in the at least one clamping seal,
    a peripheral end of the window pane or panel being surrounded and engaged in the recess of the clamping seal,
    a frame part with a seal housing which surrounds an inner face of the window pane or panel along a peripheral path, wherein the seal housing has an open end facing the window pane or panel,
    an inflatable seal arranged in the seal housing,
    a gas or air pressure source which is connected to the inflatable seal, and
    emergency actuation means to release pressure from the pressure source, wherein released gas or air expands the inflatable seal which pushes the window pane or panel out of the clamping seal, wherein a support sheet is affixed in the seal housing and which fits at least partly with the seal housing, the inflatable seal being mounted in the support sheet, and wherein
    at least one side wall of the support sheet has an end part projecting out of the seal housing and on which rests the inner face of the panel or window pane, the end part of the at least one side wall of the support sheet being inserted in the recess of the clamping seal.

2. An ejection system according to claim 1, wherein the emergency actuation means comprise at least one of a manual activation handle arranged in a cabin and automatic detection and activating means integrated in an automatic tablet.

3. An ejection system according to the claim 2, wherein a second manual activation handle is provided at the outside of the cabin.

4. An ejection system according to claim 1, wherein the inflatable seal is made of a material selected from the group consisting of elastomers and reinforcing materials.

5. An ejection system according to claim 1, wherein a combination of a shape of the inflatable seal and of a shape of the support sheet produces a pushing force F mostly in an orthogonal direction to the inner face of the panel or window pane.

6. An ejection system according to claim 5, wherein the panel or window pane has, on its inner face, a projecting zone, facing a movable part of the inflatable seal, to minimize a required stroke of the movable part to eject the window pane.

7. An ejection system according to claim 1, wherein the pressure source is a gas cartridge.

8. An ejection system according to claim 1, wherein the pressure source is an air source.

9. An ejection system according to claim 5, further including a locking device which deactivates the emergency actuation means.

10. An ejection system according to claim 1, further including an emergency jettison panel or window pane.

11. An ejection system according to claim 10, further including a door for an aircraft.

12. An aircraft comprising an emergency jettison window pane or jettison panel, associated with an ejection system according to claim 1.

13. An ejection system according to claim 7, wherein the gas cartridge contains $CO_2$.

14. An ejection system for a window panel, said system comprising:
    a frame with a frame periphery;
    a clamping seal affixed to the frame along the frame periphery, the clamping seal having clamping seal periphery and a recess extending along the clamping seal periphery from the clamping seal periphery towards the frame periphery;
    a window panel having a window periphery, an inner face, and an outer face, the window periphery being disposed within the recess;
    a frame part extending from the frame and having a seal housing which faces and surrounds the inner face of the window panel along a peripheral path, the seal housing having an open end facing the window panel;
    a support sheet affixed in the seal housing and which fits at least partly with the seal housing, the support sheet having at least one side wall having an end part projecting out of the seal housing and on which rests the inner face of the window panel, the end part being disposed within the clamping seal recess adjacent the window periphery;
    an inflatable seal arranged in the support sheet in the seal housing;
    a pressurized gas source connected with the inflatable seal; and
    an actuator to release gas from the pressurized gas source to expand the inflatable seal which pushes the window panel out of the clamping seal.

15. An ejection system according to claim 14, wherein a combination of a shape of the inflatable seal and of a shape of the support sheet produces a pushing force F mostly in an orthogonal direction to the inner face of the window panel.

16. An ejection system according to claim 14, wherein the end part of the support sheet engages the clamping seal and the window periphery within the recess.

17. An ejection system according to claim 14, wherein the end part of the at least one side wall of the support sheet is parallel with and abuts the window periphery.

18. An ejection system for a window panel affixed in a frame with a clamping seal, said seal comprising:
    a clamping seal body affixed to the frame along a periphery of the frame, the clamping seal body having a clamping seal periphery and a recess, the window panel having a window periphery, an inner face, and an outer face, with the window periphery being disposed within the recess;

a frame part that connects with the frame and has a seal housing that faces and surrounds the inner face of the window panel, the seal housing having an open end facing the window panel;

a support sheet affixed in the seal housing, the support sheet having at least one side wall having an end part projecting out of the seal housing and on which rests the inner face of the window panel, the end part being disposed within the clamping seal recess adjacent the window periphery;

an inflatable seal arranged in the support sheet in the seal housing;

an actuatable pressurized gas source connected with the inflatable seal capable of releasing gas from the pressurized gas source to expand the inflatable seal to push the window panel away from the seal housing out of the clamping seal.

19. An ejection system according to claim 18, wherein a combination of a shape of the inflatable seal and of a shape of the support sheet produces a pushing force F directed primarily in an orthogonal direction to the inner face of the window panel.

20. An ejection system according to claim 18, wherein the end part of the support sheet engages the clamping seal and the window periphery within the recess.

* * * * *